(12) United States Patent
Friedman et al.

(10) Patent No.: US 9,443,270 B1
(45) Date of Patent: Sep. 13, 2016

(54) OBTAINING INSURANCE INFORMATION IN RESPONSE TO OPTICAL INPUT

(71) Applicant: Allstate Insurance Company, Northbrook, IL (US)

(72) Inventors: Benjamin Friedman, Chicago, IL (US); Yuval Saban, Oak Park, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/029,469

(22) Filed: Sep. 17, 2013

(51) Int. Cl.
*G06Q 40/08* (2012.01)
*G06F 3/00* (2006.01)

(52) U.S. Cl.
CPC .................... *G06Q 40/08* (2013.01)

(58) Field of Classification Search
None
See application file for complete search history.

(56) References Cited

U.S. PATENT DOCUMENTS

| | | |
|---|---|---|
| 5,950,169 A | 9/1999 | Borghesi et al. |
| 6,060,989 A | 5/2000 | Gehlot |
| 6,061,610 A | 5/2000 | Boer |
| 6,076,028 A | 6/2000 | Donnelly et al. |
| 6,141,611 A | 10/2000 | Mackey et al. |
| 6,246,933 B1 | 6/2001 | Bague |
| 6,262,657 B1 | 7/2001 | Okuda et al. |
| 6,295,492 B1 | 9/2001 | Lang et al. |
| 6,330,499 B1 | 12/2001 | Chou et al. |
| 6,472,982 B2 | 10/2002 | Eida et al. |
| 6,509,868 B2 | 1/2003 | Flick |
| 6,594,579 B1 | 7/2003 | Lowrey et al. |
| 6,611,740 B2 | 8/2003 | Lowrey et al. |
| 6,641,038 B2 | 11/2003 | Gehlot et al. |
| 6,701,234 B1 | 3/2004 | Vogelsang |
| 6,732,020 B2 | 5/2004 | Yamagishi |
| 6,732,031 B1 | 5/2004 | Lightner et al. |
| 6,741,168 B2 | 5/2004 | Webb et al. |
| 6,762,020 B1 | 7/2004 | Mack et al. |
| 6,765,499 B2 | 7/2004 | Flick |
| 6,798,356 B2 | 9/2004 | Flick |

(Continued)

FOREIGN PATENT DOCUMENTS

| | | |
|---|---|---|
| AU | 2002301438 B2 | 9/2006 |
| AU | 2007200869 A1 | 3/2007 |

(Continued)

OTHER PUBLICATIONS

"For insurance companies, the day of digital reckoning." Bain & Company. 2013.

(Continued)

*Primary Examiner* — Robert R Niquette
*Assistant Examiner* — Joseph W King
(74) *Attorney, Agent, or Firm* — Banner & Witcoff, Ltd.

(57) ABSTRACT

Systems and methods are provided for retrieving insurance information of an insurance customer at a mobile device. An insurance information token may be affixed to a vehicle and scanned by an optical input device of the mobile device. The optical input device may thus obtain optical input corresponding to the insurance information token. The insurance information of the insurance customer may be retrieved based on the optical input and presented at a display device of the mobile device upon retrieval. The mobile device may also provide a message to an insurance system indicating that the insurance information token was scanned. Telematics information may also be analyzed in response to receipt of the message to determine whether to automatically create an insurance claim for the customer.

9 Claims, 8 Drawing Sheets

(56) References Cited

U.S. PATENT DOCUMENTS

| | | |
|---|---|---|
| 6,909,947 B2 | 6/2005 | Douros et al. |
| 6,925,425 B2 | 8/2005 | Remboski et al. |
| 6,946,966 B2 | 9/2005 | Koenig |
| 6,982,654 B2 | 1/2006 | Rau et al. |
| 6,988,033 B1 | 1/2006 | Lowrey et al. |
| 7,069,118 B2 | 6/2006 | Coletrane et al. |
| 7,082,359 B2 | 7/2006 | Breed |
| 7,092,803 B2 | 8/2006 | Kapolka et al. |
| 7,113,127 B1 | 9/2006 | Banet et al. |
| 7,119,669 B2 | 10/2006 | Lundsgaard et al. |
| 7,129,826 B2 | 10/2006 | Nitz et al. |
| 7,133,661 B2 | 11/2006 | Hatae et al. |
| 7,143,290 B1 | 11/2006 | Ginter et al. |
| 7,155,259 B2 | 12/2006 | Bauchot et al. |
| 7,155,321 B2 | 12/2006 | Bromley et al. |
| 7,174,243 B1 | 2/2007 | Lightner et al. |
| 7,271,716 B2 | 9/2007 | Nou |
| 7,305,293 B2 | 12/2007 | Flick |
| 7,348,895 B2 | 3/2008 | Lagassey |
| 7,477,968 B1 | 1/2009 | Lowrey et al. |
| 7,565,230 B2 | 7/2009 | Gardner et al. |
| 7,671,727 B2 | 3/2010 | Flick |
| 7,715,961 B1 | 5/2010 | Kargupta |
| 7,747,365 B1 | 6/2010 | Lowrey et al. |
| 7,970,834 B2 | 6/2011 | Daniels et al. |
| 8,000,979 B2 | 8/2011 | Blom |
| 8,014,789 B2 | 9/2011 | Breed |
| 8,019,629 B1* | 9/2011 | Medina et al. .................. 705/4 |
| 8,041,635 B1 | 10/2011 | Garcia et al. |
| 8,069,060 B2 | 11/2011 | Tipirneni |
| 8,090,598 B2 | 1/2012 | Bauer et al. |
| 8,140,358 B1* | 3/2012 | Ling et al. .......................... 705/4 |
| 8,214,100 B2 | 7/2012 | Lowrey et al. |
| 8,229,759 B2 | 7/2012 | Zhu et al. |
| 8,260,639 B1 | 9/2012 | Medina, III et al. |
| 8,271,187 B2 | 9/2012 | Taylor et al. |
| 8,285,588 B2 | 10/2012 | Postrel |
| 8,311,858 B2 | 11/2012 | Everett et al. |
| 8,321,086 B2 | 11/2012 | Park et al. |
| 8,330,593 B2 | 12/2012 | Golenski |
| 8,370,254 B1 | 2/2013 | Hopkins, III et al. |
| 8,401,877 B2 | 3/2013 | Salvagio |
| 8,403,225 B2 | 3/2013 | Sharra |
| 8,417,604 B2 | 4/2013 | Orr et al. |
| 8,423,239 B2 | 4/2013 | Blumer et al. |
| 8,432,262 B2 | 4/2013 | Talty et al. |
| 8,433,590 B2 | 4/2013 | Prescott |
| 8,438,049 B2 | 5/2013 | Ranicar, III et al. |
| 8,442,508 B2 | 5/2013 | Harter et al. |
| 8,447,459 B2 | 5/2013 | Lowrey et al. |
| 8,452,486 B2 | 5/2013 | Banet et al. |
| 8,463,488 B1 | 6/2013 | Hart |
| 8,466,781 B2 | 6/2013 | Miller et al. |
| 8,478,514 B2 | 7/2013 | Kargupta |
| 8,484,113 B2 | 7/2013 | Collopy et al. |
| 8,494,938 B1 | 7/2013 | Kazenas |
| 8,510,200 B2 | 8/2013 | Pearlman et al. |
| 8,527,135 B2 | 9/2013 | Lowrey et al. |
| 8,571,895 B1 | 10/2013 | Medina, III et al. |
| 8,577,703 B2 | 11/2013 | McClellan et al. |
| 8,595,034 B2 | 11/2013 | Bauer et al. |
| 8,598,977 B2 | 12/2013 | Maalouf et al. |
| 8,620,692 B2 | 12/2013 | Collopy et al. |
| 8,630,768 B2 | 1/2014 | McClellan et al. |
| 8,633,985 B2 | 1/2014 | Haynes et al. |
| 8,635,091 B2 | 1/2014 | Amigo et al. |
| 9,325,807 B1 | 4/2016 | Meoli et al. |
| 2002/0111725 A1 | 8/2002 | Burge |
| 2003/0233261 A1 | 12/2003 | Kawahara et al. |
| 2004/0083123 A1 | 4/2004 | Kim et al. |
| 2004/0088090 A1 | 5/2004 | Wee |
| 2004/0186744 A1 | 9/2004 | Lux |
| 2004/0189493 A1 | 9/2004 | Estus et al. |
| 2004/0205622 A1 | 10/2004 | Jones et al. |
| 2005/0021374 A1 | 1/2005 | Allahyari |
| 2005/0161505 A1 | 7/2005 | Yin et al. |
| 2005/0216487 A1 | 9/2005 | Fisher et al. |
| 2005/0278082 A1 | 12/2005 | Weekes |
| 2006/0224305 A1 | 10/2006 | Ansari et al. |
| 2006/0226960 A1 | 10/2006 | Pisz et al. |
| 2007/0009136 A1 | 1/2007 | Pawlenko et al. |
| 2007/0043594 A1 | 2/2007 | Lavergne |
| 2007/0136162 A1 | 6/2007 | Thibodeau et al. |
| 2007/0162308 A1 | 7/2007 | Peters |
| 2007/0288268 A1 | 12/2007 | Weeks |
| 2008/0027761 A1 | 1/2008 | Bracha |
| 2008/0242261 A1 | 10/2008 | Shimanuki et al. |
| 2008/0294690 A1 | 11/2008 | McClellan et al. |
| 2009/0106052 A1 | 4/2009 | Moldovan |
| 2009/0164504 A1 | 6/2009 | Flake et al. |
| 2009/0198772 A1 | 8/2009 | Kim et al. |
| 2009/0254241 A1 | 10/2009 | Basir |
| 2009/0265385 A1* | 10/2009 | Beland et al. .............. 707/104.1 |
| 2010/0030540 A1 | 2/2010 | Choi et al. |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 | 7/2010 | Stender et al. |
| 2011/0015946 A1 | 1/2011 | Buckowsky et al. |
| 2011/0070834 A1 | 3/2011 | Griffin et al. |
| 2011/0077028 A1 | 3/2011 | Wilkes, III et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0185178 A1 | 7/2011 | Gotthardt |
| 2011/0281564 A1 | 11/2011 | Armitage et al. |
| 2011/0307188 A1 | 12/2011 | Peng et al. |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1 | 5/2012 | McQuade et al. |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kote et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0073318 A1 | 3/2013 | Feldman et al. |
| 2013/0073321 A1 | 3/2013 | Hofmann et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197945 A1* | 8/2013 | Anderson ........................ 705/4 |
| 2013/0204645 A1* | 8/2013 | Lehman et al. .................. 705/4 |
| 2013/0211660 A1 | 8/2013 | Mitchell |
| 2013/0226397 A1 | 8/2013 | Kuphal et al. |
| 2013/0289819 A1 | 10/2013 | Hassib et al. |
| 2013/0290036 A1 | 10/2013 | Strange |

(56) References Cited

U.S. PATENT DOCUMENTS

| | | | |
|---|---|---|---|
| 2013/0297353 A1* | 11/2013 | Strange et al. | 705/4 |
| 2013/0297418 A1 | 11/2013 | Collopy et al. | |
| 2013/0300552 A1 | 11/2013 | Chang | |
| 2013/0311209 A1 | 11/2013 | Kaminski et al. | |
| 2013/0316310 A1 | 11/2013 | Musicant et al. | |
| 2013/0317860 A1 | 11/2013 | Schumann, Jr. | |
| 2013/0339062 A1 | 12/2013 | Brewer et al. | |
| 2014/0244312 A1 | 8/2014 | Gray et al. | |

FOREIGN PATENT DOCUMENTS

| | | |
|---|---|---|
| CA | 2658219 A1 | 1/2008 |
| EP | 1826734 A1 | 8/2007 |
| EP | 1965361 A2 | 9/2008 |
| EP | 2481037 A1 | 8/2012 |
| GB | 2486384 A | 6/2012 |
| GB | 2488956 A | 9/2012 |
| WO | 02079934 A2 | 10/2002 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |

OTHER PUBLICATIONS

"New Idea: QR Codes for License Plates." Feb. 11, 2011. Retrieved from <http://www.andrewcmaxwell.com/2011/02/new-idea-qr-codes-for-license-plates> on May 21, 2013.
"QR Code." IDL Services. Retrieved from <http://www.internationaler-fuehrerschein.com/en/the-idd/qr-code-quick-response-code-feature-in-the-idd.html> on May 21, 2013.
"Vehicle Wrap Trends: What are QR Codes and why do I need one?" The Brandtastic Branding & Marketing Education Blog. Retrieved from <http://www.sunrisesigns.com/our-blog/bid/34661/Vehicle-Wrap-Trends-What-are-QR-Codes-and-why-do-I-need-one> on May 21, 2013.
"Near Field Communication: A Simple Exchange of Information." Samsung. Mar. 5, 2013. Retrieved from <http://www.samsung.com/us/article/near-field-communication-a-simple-exchange-of-information> on May 21, 2013.
"Microsoft Tag Implementation Guide." Aug. 2010.
"New Technology Security Risks : QR codes and Near Field Communication." Retrieved from <http://www.qwiktag.com/index.php/knowledge-base/150-technology-security-risks-qr-codes> on Nov. 13, 2013.
"Encrypted QR Codes." qrworld. Nov. 11, 2011. Retrieved from <http://qrworld.wordpress.com/2011/11/27/encrypted-qr-codes> on Nov. 12, 2013.
"Fraunhofer offers secure NFC keys that can be shared via QR codes." NFC World. Mar. 20, 2013. Retrieved from <http://www.nfcworld.com/2013/03/20/323184/fraunhofer-offers-secure-nfc-keys-that-can-be-shared-via-qr-codes> on Nov. 13, 2013.
"Insurance Tech Trends 2013." Deloitte. 2013.
"Trends 2013—North American Insurance eBusiness and Channel Strategy." Forrester. May 16, 2013.
"Top 10 Technolgy Trends Impacting Life and PC Insurers in 2013." Gartner. Mar. 27, 2013.
"The Automated Collision Notification System." NHTSA. Retrieved from <http://www.nhtsa.gov/DOT/NHTSA/NRD/Articles/EDR/PDF/Research/Automated_Collision_Notification_System.pdf> on Nov. 12, 2013.
"ACN Field Operational Test—Final Report." NHTSA. Oct. 31, 2000.
"ACN Field Operational Test—Evaluation Report." NHTSA. Feb. 2001.
"Automatic Crash Notification." ComCARE Alliance. Retrieved from <http://www.nhtsa.gov/DOT/NHTSA/NRD/Articles/EDR/PDF/Research/ComCARE_ACN_System.pdf> on Nov. 12, 2013.
"GEICO App—Android Apps on Google Play." Retreived from <https://play.google.com/store/apps/details?id=com.geico.mobile&hl=en> on Nov. 12, 2013.
"Automatic License Plate Recognition (ALPR) Scanning Systems." Retrieved from <http://www.experiencedcriminallawyers.com/articles/automatic-license-plate-recognition-alpr-scanning-systems> on Jun. 28, 2013.
"License plate readers allow police to quickly scan, check for offenders." Mar. 17, 2013. Retrieved from <http://cjonline.com/news/2013-03-17/license-plate-readers-allow-police-quickly-scan-check-offenders> on Jun. 28, 2013.
"Scan Someone's License Plate and Message Them Instantly with New Bump App." Sep. 17, 2010. Retrieved from <http://www.popsci.com/cars/article/2010-09/social-networking-site-uses-license-plates-connect-drivers> on Jun. 28, 2013.
"License Plate Scanner Obsoletes Meter Maid." Feb. 1, 2011. Retrieved from <http://www.thetruthaboutcars.com/2011/02/license-plate-scanner-obsoletes-meter-maid> on Jun. 28, 2013.
Aug. 12, 2014—(US) Non-Final Office Action—U.S. Appl. No. 14/022,552.
Jan. 12, 2015—(US) Amendment and Response to Non-Final Office Action—U.S. Appl. No. 14/022,552.
Mar. 4, 2015—(US) Final Office Action—U.S. Appl. No. 14/022,552.
Jun. 4, 2015—(US) Amendment and Response with Request for Continued Examination—U.S. Appl. No. 14/022,552.
Oct. 22, 2014—(US) Non-Final Office Action—U.S. Appl. No. 14/039,722.
Mar. 23, 2015—(US) Amendment and Response—U.S. Appl. No. 14/039,722.
Sep. 30, 2014—(US) Non-Final Office Action—U.S. Appl. No. 14/313,753.
Feb. 25, 2015—(US) Amendment and Response—U.S. Appl. No. 14/313,753.
"A study of US crash statistics from automated crash notification data." 20th International Technical Conference on the Enhanced Safety of Vehicles Conference (ESV). Lyon, France, pp. 18-21. 2007.
"Automatic Crash Response, Car Safety, & Emergency Services—OnStar" retrieved from https://www.onstar.com/web/portal/emergencyexplore?tab=g=1 on Jan. 12, 2013.
"Design and Development of a GSM Based Vehicle Theft Control System and Accident Detection by Wireless Sensor Network." International Journal of Emerging Trends in Engineering and Development, Issue 2, vol. 5, pp. 529-540.
"Mercedes-Benz mbrace." Oct. 22, 2010.
"The Potential for Automatic Crash Notification Systems to Reduce Road Fatalities." Annals of Advances in Automotive Medicine, vol. 52, pp. 85-92. 2008. (retrieved from http://www.ncbi.nlm.nih.gov/pmc/articles/PMC3256762/ on Jan. 12, 2013).
"This App Turns Smartphones Into Safe Driving Tools." Mashable. Aug. 30, 2012. Retrieved from http://mashable.com/2012/08/30/drivescribe-app-safe-driving on Nov. 12, 2013.
"Using Smartphones to Detect Car Accidents and Provide Situational Awareness to Emergency Responders." Mobile Wireless Middleware, Operating Systems, and Applications, pp. 29-42. Jul. 2010.
Maciag, A. K. (1980). Motor accident insurance and systems of compensation. (Order No. MK49023, University of Alberta (Canada)). ProQuest Dissertations and Theses, 1. Retrieved from http://search.proquest.com/docview/303097892?accountid=14753. (303097892).
Spevacek, C. E., Ledwith, J. F., Newman, T. R., Lennes, John B., Jr. (2001). Additional insured and indemnification issues affecting the insurance industry, coverage counsel, and defense counsel—legal advice and practice pointers. FDCC Quarterly, 52(1), 3-101. Retrieved from http://search.proquest.com/docview/201215466?accountid=14753.
"Privacy Policy." Lemon Wallet. Retrieved from http://lemon.com/privacy; on May 20, 2013.
"Design and implementation of a smart card based healthcare information system." Computer Methods and Programs in Biomedicine 81. pp. 66-78. Sep. 27, 2003.

(56) References Cited

OTHER PUBLICATIONS

"Information-Sharing in Out-of-Hospital Disaster Response: The Future Role of Information Technology." Abstracts of Prehospital and Disaster Medicine. Retrieved from http://journals.cambridge.org/action/display/Abstract? fromPage=online&aid=8231246; on May 20, 2013.

"Car insurance firms revving up mobile app features." Feb. 2, 2012. Retrieved from http://www.insurance.com/auto-insurance/auto-insurance-basics/car-insurance-mobile-apps.html on Jun. 28, 2013.

"Bump (application)." Retrieved from http://en.wikipedia.org/wiki/Bump_(application) on Aug. 29, 2013.

Domanico, A., Geico Releases Insurance Glovebox App for Android, Aug. 10, 2010. Retrieved from [http://androidandme.com/2010108/applications/ geico-releases-insurance-glovebox-app-for-android/].

\* cited by examiner

OBTAINING INSURANCE INFORMATION IN RESPONSE TO OPTICAL INPUT

TECHNICAL FIELD

Aspects of the present disclosure generally relate to accessing insurance information and more particularly to obtaining insurance information in response to optical input.

BACKGROUND

Traditionally, a driver keeps a hardcopy of an insurance card in a vehicle, e.g., often in the glove compartment. When a driver renews or updates an insurance policy, an insurance company will typically send the driver a new hardcopy of the insurance card. When the driver receives the new insurance card, the driver may replace the old insurance card in the vehicle with the new insurance card.

The insurance card may include information identifying the insurance company providing the insurance coverage and contact information for the insurance company; the drivers insured under the insurance policy and contact information for the drivers; a vehicle insured under the insurance policy and the color, make, model, and year of the vehicle; effective dates; and other types of insurance information.

Hardcopy insurance cards are associated with a number of disadvantages. A driver may misplace a hardcopy insurance card or forget to place the hardcopy insurance card in the vehicle. An insurance company must continually replace hardcopy insurance cards as insurance policies are renewed and insurance information changes. Moreover, an insurance company is not able to determine when a driver accesses the hardcopy insurance card, e.g., following a vehicle collision. Instead, the driver may initiate contact with the insurance company when insurance services are needed.

Therefore, a need exists for an improved approach to providing insurance information that makes receipt and display of insurance information more efficient for drivers and that allows an insurance company to proactively provide insurance services when customers access their insurance information.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a method of retrieving insurance information of an insurance customer at a mobile device. An insurance information token may be affixed to a vehicle and scanned by an optical input device of the mobile device. The optical input device may thus obtain optical input corresponding to the insurance information token. The insurance information of the insurance customer may be retrieved based on the optical input and presented at a display device of the mobile device upon retrieval. The mobile device may also provide a message to an insurance system indicating that the insurance information token was scanned.

A second aspect described herein provides an apparatus for retrieving insurance information of an insurance customer at a mobile device. The apparatus may include at least one processor and a data store that stores the insurance information associated with the insurance customer. A message handler may receive a message from a mobile device indicating that the mobile device has scanned an insurance information token affixed to a vehicle. The message handler may initiate creation of a record corresponding to the message and may also initiate a response to the message. The message may indicate the date, time, and geographic location at which the mobile device scanned the insurance information token.

A third aspect described herein provides non-transitory computer-readable media for retrieving insurance information of an insurance customer at a mobile device. A mobile device may scan an insurance information token that is affixed to a vehicle using an optical input device and obtain optical input corresponding to the insurance information token. The mobile device may retrieve insurance information for an insurance customer associated with the insurance information token based on the optical input. Upon retrieving the insurance information, the mobile device may present the insurance information at a display device. The mobile device may also provide a message to an insurance system indicating that the insurance information token was scanned. In response to receipt of the message, the insurance system may create a record that corresponds to the message. The insurance system may also, in response to receipt of the message, determine whether the vehicle was involved in an incident based on telematics information received from the vehicle.

The insurance information token may encode the insurance information itself or a unique identifier used to retrieve the insurance information. Accordingly, an optical input decoder may decode the optical input to obtain the insurance information or the unique identifier. The unique identifier may be provided to an insurance system that stores the insurance information and associates the insurance information with the unique identifier. In response to receipt of a request that includes the unique identifier, the insurance system may provide the insurance information to a mobile device.

The insurance information token may also include an image, and the optical input may thus include image data corresponding to the image. An image matcher at the mobile device or the insurance system may compare the image data to an image stored at a data store and associated with the insurance customer. If the image data substantially matches stored image associated with the insurance customer, then the requested insurance information may be provided.

A record analyzer may compare scan information included in respective messages received from the mobile devices associated with insurance customers. A determination of whether to associate the insurance customers with one another may be made based on the comparison of scan information. If the scan information substantially matches, then the insurance customers may be associated with one another.

Telematics information may also be received from respective vehicles associated with the insurance customers. A telematics analyzer may determine whether a telematics event involving a vehicle has occurred. If so, the insurance display analyzer may compare scan information to telematics information to determine whether an insurance information token was scanned in response to the telematics event. If so, an insurance claim may be automatically created and associated with the insurance customer. The telematics analyzer may also determine whether to associate another insurance customer with the insurance claim based on a comparison of telematics information. An additional insurance customer may be associated with the insurance claim when the telematics information received from the vehicle associated with the additional insurance customer substantially matches telematics information received from a vehicle associated with another insurance customer.

Questions may also be provided to the mobile device in response to receipt of a message indicating that the insurance information token was scanned at the mobile device. Answers to the questions may be received and provided to an insurance agent. The insurance agent may also be notified in response to receipt of a message indicating that the insurance information token was scanned at the mobile device.

A non-transitory computer-readable medium having computer-executable instructions stored thereon that carry out one or more of the steps described above is further provided. As used in this disclosure non-transitory computer-readable media include all types of computer-readable media with the sole exception of a transitory propagating signal.

The details of these and other embodiments of the disclosure are set forth in the accompanying drawings and description below. Other features and advantages of aspects of the disclosure will be apparent from the description and drawings.

DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

DETAILED DESCRIPTION

Aspects of the present disclosure are directed towards various approaches to obtaining insurance information for display at a mobile device. In particular, example implementations may retrieve insurance information associated with an insurance customer based on optical input received at the mobile device. The optical input may be obtained, e.g., by scanning a barcode affixed to a vehicle of the insurance customer. The optical input may also be obtained, e.g., by capturing an image at the mobile device. In some example implementations, the mobile device may store the insurance information and display the insurance information in response to receipt of the optical input. In other example implementations, the insurance information may be stored remotely relative to the mobile device, and the mobile device may retrieve the remotely stored insurance information in response to receipt of the optical input.

Moreover, an insurance system may be notified when insurance customers request access to their insurance information In this way, an insurance company may proactively follow-up with an insurance customer to determine whether any insurance-related services are needed. For example, an insurance customer may access the insurance information following an insurance-related incident such as, e.g., a vehicle collision. Upon determining that an insurance customer accessed or requested the insurance card image, the insurance company may proactively contact the insurance customer to determine whether the insurance customer needs any insurance-related services such as, e.g., filing an insurance claim. As described in further detail below, the insurance company may identify additional parties involved in the incident based on insurance card access or requests and, additionally or alternatively, an analysis of vehicle telematics data received from the vehicle of the insurance customers. As used in this disclosure, an insurance-related incident refers to an event that may result in the filing of an insurance claim with an insurance company. An incident may involve one or more parties that may or may not be customers of the insurance company. For example some of the parties may be customers of one insurance company while other parties may be customers of another insurance company (e.g., a third-party insurance company). These and other aspects will be appreciated with the benefit of the more detailed description provided below.

Figure 1:
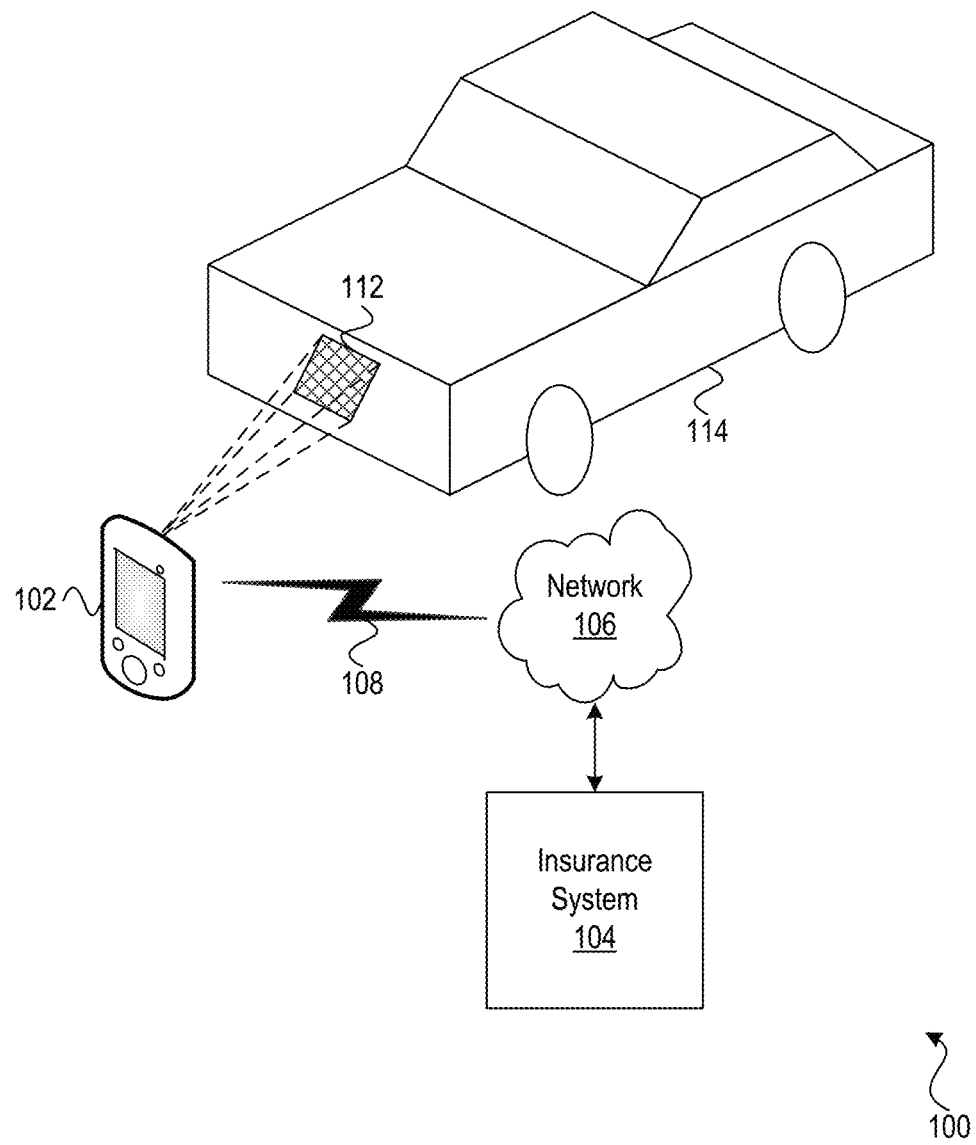
FIG. 1 is an example of an implementation of a system for obtaining insurance information in response to optical input.

Referring to FIG. 1 an example of an implementation of a system 100 for obtaining insurance information in response to optical input at a mobile device 102. As seen in FIG. 1, the mobile device 102 may be in signal communication with a an insurance system 104 via a network 106. The mobile device 102 may be, e.g., a mobile telephone, a personal digital assistant (PDA), a palmtop computer, a tablet computer, a laptop computer, and other mobile computing devices configurable to exchange communications via a communication network. It will be appreciated that the insurance system 104 may provide an insurance card image to other types of computing devices (such as desktop computers) that are also in signal communication with the insurance system via the network 106. The network 106 may be a wireless network such as a cellular network, a wired network such as the Internet, or a combination of a wired or wireless network. Accordingly, the mobile device 102 and the insurance system 104 may exchange communications 108 via the network 106.

The insurance system 104 may maintain and store insurance information for a user (e.g., the insurance customer) associated with the mobile device 102. The insurance system 104 may provide insurance information to the mobile device 102 in response to receipt of a request from the mobile device. It will be appreciated that because the insurance system 104 stores the insurance information remotely relative to the mobile device 102, the insurance system may update the insurance information, and the mobile device may have access to the most up-to-date insurance information for the insurance customer. As noted above, the insurance information may also be stored at the mobile device 102 itself.

As also noted above, the mobile device 102 may obtain insurance information based on optical input received at the mobile device. As seen in FIG. 1, the optical input may correspond to an insurance information token 112 affixed to a vehicle 114 associated with the insurance customer. In response to receipt of the optical input, the mobile device 102 may retrieve the insurance information from a data store at the mobile device or request the insurance information from the insurance system 104. Retrieving insurance information based on the optical input received at the mobile device 102 will be discussed in further detail below. Having retrieved the insurance information following receipt of the optical input, the mobile device 102 may present the insurance information at a display screen.

Figure 2:
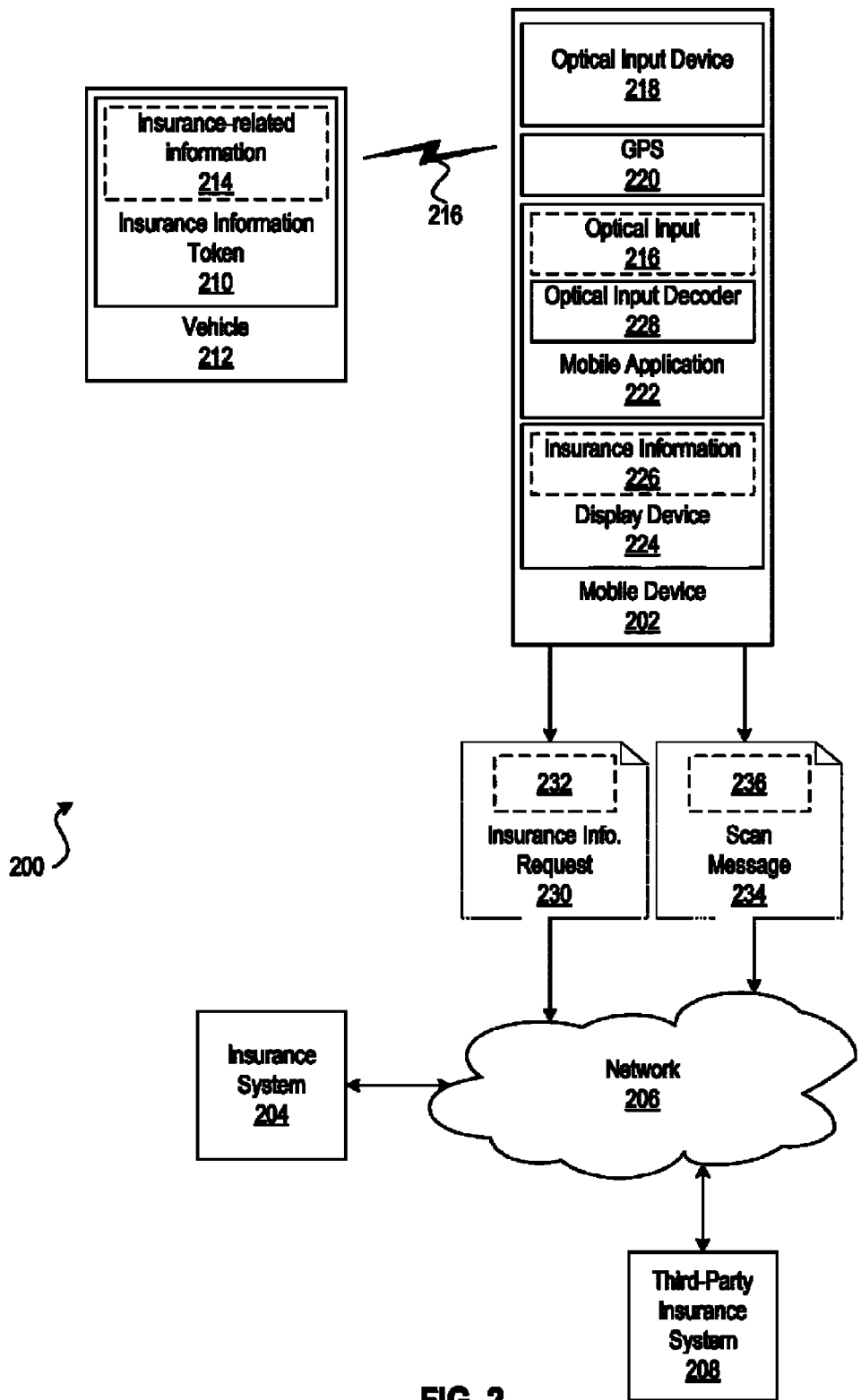
FIG. 2 is a block diagram of an example of an implementation of a system for obtaining insurance information in response to optical input.

FIG. 2 is a block diagram of an example of an implementation of a system 200 for obtaining insurance information in response to optical input. As described above with reference to FIG. 1, a mobile device 202 may be in signal communication with an insurance system 204 via a network 206. The insurance system 204 may also be in signal communication with a third-party insurance system 208 via the network 206. An insurance information token 210 may be affixed to a portion of a vehicle 212. The insurance information token 210 may include insurance-related information 214. The mobile device 202 may obtain optical input 216 of the insurance information token 210 in order to obtain insurance information of an insurance customer associated with the vehicle 212.

As seen in FIG. 2, the mobile device 202, in this example, includes: an optical input device 218 that obtains the optical input 216 of the insurance information token 210; a global positioning system (GPS) device 220 that determines a geographic location of the mobile device (e.g., latitude and longitude); a mobile application 222 that facilitates retrieval and display of the insurance information; and a display device 224 that presents the insurance information 226 at the mobile device. The optical input 216 may be stored at the mobile device 202 and utilized by the mobile application to retrieve the insurance information 226 of the insurance customer. The mobile application, in this example, also includes an optical input decoder 228 configured to decode the optical input 216. In other example implementations, the mobile device 202 may include an optical input decoder that is separate from and in signal communication with the mobile application 222.

The insurance information token 210 ("token") may be affixed to any portion of the vehicle 212 suitable for obtaining optical input 216 of the token. For example, the token 210 may be affixed to a front or rear window of the vehicle 212, a side window of the vehicle, a bumper of the vehicle, or a front or rear license plate of the vehicle. An insurance customer may thus initiate retrieval and display of insurance information by obtaining optical input 216 corresponding to the token 210 affixed to the vehicle.

The token 210 may include a barcode such as, e.g., a linear barcode or a matrix barcode. Examples of matrix barcodes include a QR (Quick Response) code. Accordingly, the optical input device 218 may be a barcode scanner and the optical input decoder 228 may be configured to decode optical input corresponding to a barcode. The barcode of a token 210 may encode the insurance information of the insurance customer such as, e.g., insurance provider, insurance policy information, and contact information. Additionally or alternatively, the barcode of a token 210 may encode information used to retrieve the insurance information of the insurance customer, e.g., an identifier that uniquely identifies the insurance customer. The mobile device 202 may scan the barcode using the optical input device 218 (e.g., the barcode scanner) and obtain optical input 216 corresponding to the barcode. If the barcode of the token 210 encodes the insurance information of the insurance customer, then the optical input decoder 228 may then decode the optical input 216 to obtain the insurance-related information 214 encoded in the barcode. If the barcode of the token 210 encodes information used to retrieve insurance information, then optical input decoder may decode the optical input 216 to obtain the information used to retrieve the insurance information of the insurance customer.

As mentioned above, an insurance system 204 may store the insurance information for a customer and provide the insurance information to a mobile device in response to receipt of a request from a mobile device. The request for insurance information may be referred to as an insurance information request 230. The insurance information request 230 may include information 232 that identifies an insurance customer. The information 232 may be a unique identifier as mentioned above such as, e.g., an insurance customer number. The information 232 may be encoded as the insurance-related information 214 in the barcode of the insurance information token 210. Accordingly, the mobile device 202 may scan the barcode using the optical input device 218 (e.g., the barcode scanner) and obtain optical input 216 corresponding to the barcode. The optical input decoder 228 may then decode the optical input 216 to obtain the insurance-related information 214 encoded in the barcode (e.g., the unique identifier). The mobile application 222 may then generate an insurance information request 230 containing the unique identifier as the information 232 of the insurance information request. In response to receipt of the insurance information request 230, the insurance system 204 may perform a lookup in its customer data store, find the insurance information for the customer that matches the unique identifier, and provide the requested insurance information back to the mobile device 202.

In some example implementations, the insurance information request 230 may be associated with one or more security-related features to ensure that only the insurance customer can receive the requested insurance information 226. Security features may include, e.g., a password, a personal identification number (PIN), and other security-related features. These security-related features may also be selectively employed when responding to requests for insurance information 226 at the mobile device 202. For example, the mobile application 202 may require a user to enter a password or PIN before submitting the insurance information request 230 to the insurance system 204. Additionally or alternatively, the insurance system 204 may authenticate an insurance information request 230 using, e.g., a password or PIN received with the insurance information request. In some example implementations, however, that users other than the insurance customers may scan the insurance information token 210 in order to receive the insurance information 226 associated with an insurance customer. Other users that may scan the insurance information may include, e.g., other drivers or law enforcement personnel. An insurance information request 230 may, for example, include an indicator identifying the user as a member of a law enforcement agency, and the insurance system 204 may provide the requested insurance information in response to receipt of the indicator identifying the user as a law enforcement agent.

The token 210 may additionally or alternatively include an image such as a symbol, an icon, a pattern, a picture, or other type of graphic-based content. Accordingly, the optical input device 218 may be a camera or other type of image input device of the mobile device 202. The optical input 216 may thus include image data corresponding to the image of the token 210, and the optical input decoder 228 may be an image matcher. In this example, the mobile device may store a copy of the image in the token 210, e.g., as an image file. The mobile application 222 may utilize the optical input decoder 228 (e.g., the image matcher) to determine whether the image data in the optical input 216 matches (or is at least similar to) the copy of the image stored at the mobile device 202. If the image data in the optical input 216 matches the copy of the image stored at the mobile device 202, then the mobile application may, e.g., present at the display device 224 insurance information 226 that is stored at the mobile device or submit to the insurance system 204 an insurance information request 230 to request the insurance information.

In some example implementations, the mobile application 222 may include the image data of the optical input 216 in an insurance information request 230 as the information 232. The insurance information request 230 may also indicate an insurance customer the insurance information is requested for. Accordingly, the insurance system 204 may compare the image data from the optical input 216 to an image (e.g., an image file) that is stored at the insurance system and associated with the indicated insurance customer. If the insurance system 204 determines that the image data from the optical input 216 matches the image associated with the indicated insurance customer, then the insurance system may provide the mobile device the insurance information associated with the indicated customer. If the image data from the optical input 216 does not match the image associated with the indicated customer, then the insurance system 204 may notify the mobile device of the mismatch. A user may reattempt the process by obtaining new optical input 216 of the image in the token 210.

The mobile application 222 may also be configured to notify the insurance system when a user scans the insurance information token 210 with the mobile device. In this way, the insurance system 204 may advantageously follow-up with insurance customers in a proactive fashion to determine whether the insurance customers need insurance-related services. Accordingly, when a user scans the insurance information token 210, the mobile application may create a scan message 234 and transmit the scan message to the insurance system 204. The mobile application may include scan information 236 in the scan message 234. Scan information 234 may include, e.g., a date on which the token 210 was scanned, a time at which the token was scanned, and a geographic location at which the token was scanned. The mobile application 222 may obtain time and date information from a timing device (not shown) at the mobile device 202, e.g., a clock. The mobile application may obtain geographic location information (e.g., latitude and longitude) from the GPS device 220 at the mobile device 202. Because the mobile application 222 may submit an insurance information request 230 in response to a scan of the token 210, the insurance information request may be considered to be a type of scan message 234. Accordingly, the information 232 included in an insurance information request 230 may also include scan information such as, e.g., date, time, and location information. As discussed further below, the insurance system may utilize the scan information to locate additional scan messages that may have occurred on the same day, around the same time, and near the same geographic location. In this way, the insurance system may identify insurance customers that may have each been involved in an event that may require an insurance claim or other insurance-related services.

Figure 3:
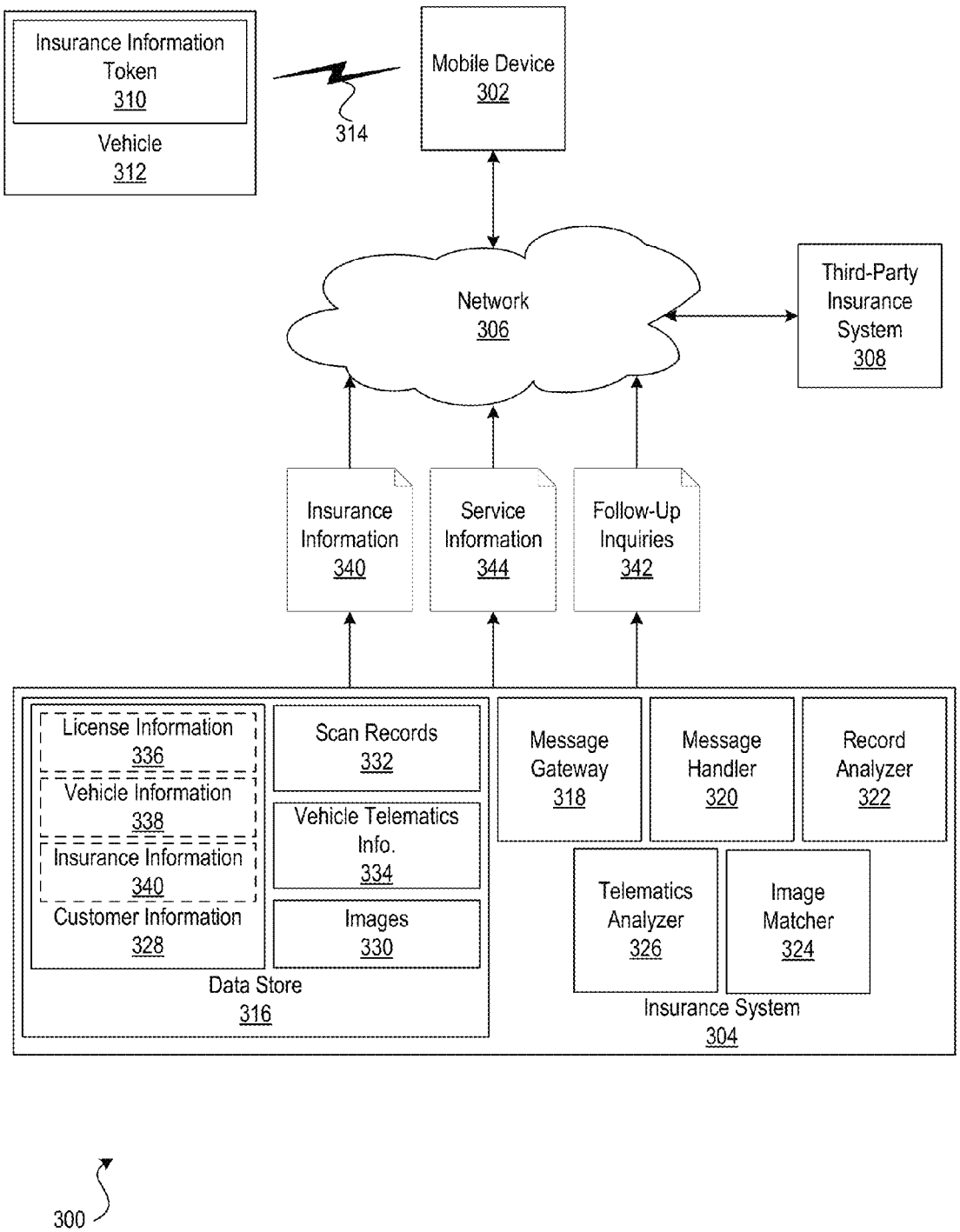
FIG. 3 is another block diagram of an example of an implementation of a system for obtaining insurance information in response to optical input.

Referring now to FIG. 3, another block diagram of an example of an implementation of a system 300 for obtaining insurance information in response to optical input is shown. As described above with reference to FIGS. 1-2, a mobile device 302 may be in signal communication with an insurance system 304 via a network 306. The insurance system 304 may also be in signal communication with a third-party insurance system 308 via the network 306. An insurance information token 310 may be affixed to a portion of a vehicle 312. The mobile device 202 may obtain optical input 314 of the insurance information token 310 in order to obtain insurance information of an insurance customer associated with the vehicle 312.

The insurance system 304, in this example, includes: a data store 316; a message gateway 318 that receives and handles messages received from the mobile device 302; an message handler 320 that processes and responds to scan messages (234 in FIG. 2) such as insurance information requests (230 in FIG. 2); an insurance information request analyzer 322 that analyzes records of insurance information requests and scan messages; an image matcher 324 that determines whether image data received from the mobile device matches an image associated with an insurance customer; and a telematics analyzer 326 that analyzes vehicle telematics data received from the vehicle 312.

The data store 316, in this example, stores: customer information 328 for insurance customers; images 330 respectively associated with the insurance customers; records 332 of insurance information requests and scan messages received from the mobile device 302; and vehicle telematics information 334 received from the vehicles 312 of the insurance customers. Customer information may include, e.g., driver's license information 338 of an insurance customer, vehicle information 340 of the vehicle 312 (e.g., color, make, model, year), and insurance information 342 for the insurance customer (e.g., insurance provider, policy information, effective dates, and contact information).

The data store 316 may include a database management system (DBMS) that facilitates storage and retrieval of information from the data store. Any data store and DBMS suitable for providing insurance-related services may be selectively employed. Moreover, it will be appreciated that the data store 316 may comprise multiple interconnected data stores. For example, the insurance system 304 may comprise an insurance customer data store that stores information relating to insurance customers, an insurance information request and scan message data store that stores records of insurance information requests and scan messages, and a vehicle telematics data store that stores vehicle telematics data received from the vehicles of insurance customers.

The message gateway 318 of the insurance system 304 may be the entry point to the insurance system for the mobile device 302. As described above, the mobile device 302 may submit insurance information requests as well as scan messages to the insurance system 304. The message gateway 318 may receive the requests and messages and route them to the appropriate component of the insurance system 304. For example, the message gateway 318 may route scan messages to the data store 316, which may create and store a record 332 corresponding to the scan message. Similar to the scan message, the record 332 corresponding to the scan message may include date, time, and geographic location information.

As another example, the message gateway 318 may route insurance information requests to the message handler 320 for processing. The data store 316 may also create and store a record 332 corresponding to the insurance information access request that also includes date, time, and geographic location information. The message handler 320 may process the insurance information access request to provide the requested insurance information. As described above, the request may indicate an insurance customer the insurance information is requested for, e.g., using a unique identifier associated with the insurance customer. The message handler 320 may thus perform a lookup in the data store 316 using the unique identifier for the insurance customer. Through the lookup at the data store 316, the message handler 320 may retrieve the insurance information 340 and provide the insurance information to the mobile device 302.

The message handler 320 may also retrieve an image 330 associated with the insurance customer indicated in the request. The image 330 may be an image selected by the insurance customer or the insurance company that may be utilized to obtain insurance information at a mobile device. The message handler 320 may provide image data included in an insurance image request to the image matcher for comparison to the image 330. The image matcher may then determine whether the image data matches the image 330 associated with the insurance customer. If the image matcher 324 determines that the received image data and the image 330 match, then the message handler 320 may retrieve the insurance information 340 from the data store and initiate transmission of the insurance information to the mobile device 302. If the image matcher 324 determines that the received image data does not match the image 330, then the request handler may not transmit the insurance information 340 to the mobile device 302. Instead the message handler 320 may initiate transmission of a notification to the mobile device that the received image data and the image 330 do not match. The image matcher may obtain a confidence value that indicates the similarity between the received image data and the image 330. The image matcher 324 may also utilize a confidence threshold to determine whether the received image data matches the image 330. The image matcher 324 may determine that the received image data matches the image 330 when the resulting confidence value exceeds the confidence threshold. The image matcher 324 may determine that the received image data does not match the image when the resulting confidence value does not exceed the confidence threshold. Various approaches to determining whether images match are well-known in the art and may be selectively employed. It will also be appreciated that image 330 and image matcher 324 may reside at the mobile device, and the mobile device itself may determine whether to display the insurance information in response to receipt of optical input that includes image data corresponding to an image of the insurance token 310.

As described, the mobile application of the mobile device 302 may generate and transmit to the insurance system 304 a scan message in response to a scan of the insurance token. A scan message informs the insurance system 304 that the insurance token has been scanned at the vehicle. Insurance customers are likely to scan their insurance tokens following an incident (e.g., a vehicle collision) that may ultimately result in the filing of an insurance claim. By receiving such notifications, the insurance system 304 may determine that the insurance customer has potentially been involved in an incident that may result in an insurance claim. Accordingly, the insurance system 304 may proactively initiate follow-up communications from the insurance company to the insurance customer in order to confirm or dismiss the potential insurance claim as well as determine whether any other insurance-related services are needed. The follow-up communications may include inquiries (e.g., a set of questions for display at the mobile application) as well as service information (e.g., insurance services, tow services, vehicle rental services, etc.). Such proactive communications from the insurance company advantageously eliminate the need for the customer to contact the insurance company thereby improving customer service and the customer experience.

The scan messages and the insurance information requests may include information such as the time, date, and location of the request. The messages and requests may include additional and alternative types of information. The corresponding records 332 may also include the date, time, and location information. The record analyzer 322 may thus analyze the records 332 to determine whether a received scan message or request matches another scan message or request. The insurance system 304 may utilize the record analyzer 322 to identify insurance customers that may have been involved in the same incident and that may be associated with the same insurance claim. The record analyzer may, for example, compare the date, time, and geographic location information. If the record analyzer 322 determines that two records match (or are at least similar to), then the record analyzer may determine that the insurance customers associated with the records were involved in the same incident. In particular, the record analyzer 322 may determine that records 332 match when the date of a first record is the same as the date of a second record, the time of the first record is within a predetermined time period of the second record (e.g., 5-10 minutes), and the geographic location of the first record is within a predetermined distance of the geographic location of the second record (e.g., 50-100 feet). In this way, the insurance system 304 may automatically identify insurance customers that may be associated with the same insurance claim.

As also described, the insurance system 304 may collect and store vehicle telematics information 334 from the vehicle of an insurance customer 312. The insurance system 304 may thus utilize the telematics analyzer to 326 to, e.g., determine whether the vehicle 312 of an insurance customer has been involved in an incident or identify additional participants in the incident. Vehicle telematics data refers to technical information relating to the status or operation of a vehicle. Vehicle telematics data may include, for example, directional acceleration and deceleration (e.g., forward/backward, left/right, up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that a vehicle telematics device may be configured to collect and record data relating to the operation and status of the vehicle. The vehicle telematics device may then provide the vehicle telematics data to, e.g., an insurance system for storage and analysis.

Information describing the collection, processing, and analysis of telematics information is described in U.S. patent application Ser. No. 13/791,338 filed on Mar. 8, 2013 and entitled "Automated Accident Detection, Fault Attribution, and Claims Processing" as well as U.S. patent application Ser. No. 13/791,287 filed on Mar. 8, 2013 and entitled "Encouraging Safe Driving Using a Remote Vehicle Starter and Personalized Insurance Rates" each of which are assigned to Allstate Insurance Company of Northbrook, Ill. and each of which are incorporated by reference in this disclosure in their entirety.

The telematics information 334 may include vehicle telematics data corresponding to the operation of the vehicles 312 of the insurance customers. The telematics analyzer 326 may analyze the telematics information 334 to identify telematics events that may be indicative of an incident involving the vehicle (e.g., a vehicle collision). Examples of telematics events that may correlate with vehicle incidents include a hard-braking event, a sudden stop event, and a hard turning event. The telematics information 334 may also identify the vehicle that provided the telematics information. Accordingly, the insurance customer associated with the vehicle that provided the telematics information 334 may be determined. The telematics information 334 may also indicate the date, time, and location at which these events occurred. It will thus be appreciated that the record analyzer 322 may determine whether a telematics event has a date, time, and location that matches (or is at least similar to) the date, time, and location of a scan message. In particular, the record analyzer 322 may determine whether a telematics event occurred on the same day, within a predetermined time period (e.g., 10-20 minutes), and within a predetermined distance (e.g., 50-100 feet) of the mobile device at which the customer scanned the insurance token. If so, then the record analyzer 322 may conclude that the vehicle 312 associated with the insurance customer was potentially involved in an incident that may result in an insurance claim.

In response to the determination that the insurance customer was potentially involved in an incident, the insurance system 304 may initiate various responses including, notifying an insurance agent so that the insurance agent may contact the insurance customer, automatically creating a placeholder insurance claim and populating the insurance claim with basic customer information, and locating additional parties involved in the incident. It will be appreciated that the record analyzer 322 may identify additional parties involved in the incident based on additional scan messages received at the insurance system 304 as well as additional telematics information 334 collected at the insurance system. For example, the record analyzer 322 may query the data store 316 to determine whether any additional scan messages were received on the same day, around the same time, and near the same geographic location as the scan message associated with the incident. The record analyzer 322 may also utilize the telematics analyzer 326 to determine if any additional telematics incidents occurred on the same day, around the same time, and near the same geographic location.

In some example implementations, the insurance system 304 may also be in signal communication with a third-party insurance system 308 via the network 306. The third-party insurance system 308 may also collect and store telematics information for its insurance customers. If the record analyzer 322 of the insurance system 304 does not identify vehicle telematics information 334 corresponding to a scan message, then the insurance system 304 may submit a query to the third-party insurance system 308 to determine whether the third-party insurance system has telematics data corresponding to the scan message. Accordingly, the query to the third-party insurance system 308 may include time, date, and location information. If the third-party insurance system 308 indicates that it has located telematics data that matches (or is at least similar to) the information associated with the scan message, then the insurance system 304 may determine that a third-party insurance customer was also involved in the incident. The insurance system 304 may request, and the third-party insurance system 308 may provide, information relating to the third-party insurance customer such as, e.g., contact information, insurance information, and other information relating to the third-party insurance customer. This information may be helpful, for example, to resolve any insurance claims arising from the incident. It will be appreciated that multiple insurance companies operating respective insurance systems may be interconnected to advantageously identify parties to potential incidents in this fashion.

In response to receipt of a scan message, or in response to a determination that one or more insurance customers may have been involved in an incident, the record analyzer 322 may initiate various responses from the insurance system 304. As one example, the insurance system 304 may notify an insurance agent of the scan message such that the insurance agent may follow-up with the insurance customer. In this way, insurance agents may proactively contact customers regarding potential incidents that may need an insurance claim to be filed. In some example implementations, the response from the insurance system 304 may be automated. The insurance system 304 may, for example, transmit instructions to the mobile application (222 in FIG. 2) at the mobile device 302 of the insurance customer instructing the mobile application to gather additional information regarding the potential incident. In response to the instructions received from the insurance system 304, the mobile application may ask the insurance customer a series of questions, e.g.: "Were you involved in a vehicle collision?"; "Do you need medical assistance?"; "Would you like to file an insurance claim?"; "Do you need vehicle towing or rental service?" Along with the instructions, the insurance system 304 may provide a set of question to the mobile application to present to the insurance customer. The insurance customer may thus provide answers to the questions presented, and the mobile application may transmit a set of answers back to the insurance system 304, which may in turn provide the set of answers to an insurance agent. The insurance system 304 may also initiate various responses automatically based on the answers provided by the insurance customer (e.g., automatically creating an insurance claim).

The insurance system 304 may respond based on the answers received from the insurance customer at the mobile application. For example, the insurance system 304 may notify an insurance agent of the incident, and the insurance agent may follow-up with the insurance customer via a phone call to carry out the claims process. The insurance system 304 may also notify emergency response authorities of the incident or provide information regarding nearby vehicle towing or rental services based on the geographic location of the insurance customer. In response to receipt of a scan message, the insurance system 304 may also automatically create a placeholder insurance claim. The insurance system 204 may populate the placeholder insurance claim with basic customer information. In this way, the placeholder insurance claim is available for the insurance agent to escalate to a confirmed insurance claim if the customer confirms an incident occurred. The insurance agent may also dismiss the placeholder insurance claim if the customer indicates an incident did not occur or that the customer does not want to file an insurance claim. In this way, the insurance system 304 may advantageously automate aspects of filing insurance claims in response to receipt of scan messages received from the mobile application at the mobile device of the insurance customer.

Figure 4:
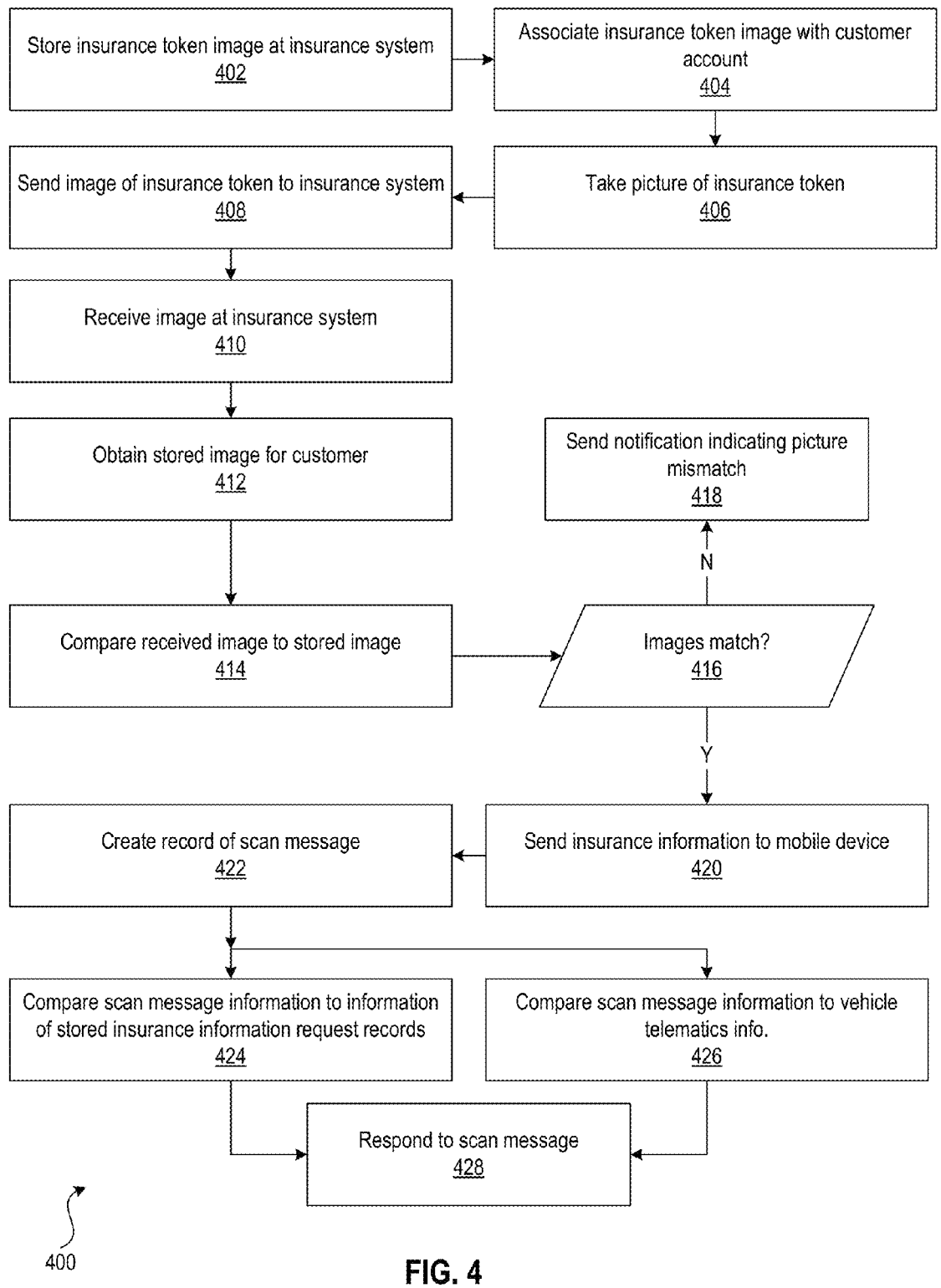
FIG. 4 is a flowchart of example method steps for obtaining insurance information in response to optical input.

Referring now to FIG. 4, a flowchart of example method steps for obtaining insurance information in response to optical input is shown. The steps in FIG. 4 are described in the context of insurance information tokens that include an image. It will be appreciated, however, that some of the steps may also be applicable in contexts where the insurance information token includes a barcode such as, e.g., a QR code. An insurance company may implement an insurance system that stores an insurance token image (block 402). Insurance token images may be respectively associated with individual accounts for insurance customers (block 404). The insurance token may be affixed to the vehicle of an insurance customer, and the insurance customer may obtain optical input corresponding to the insurance token, e.g., take a picture of the insurance token using a camera of a mobile device (block 406). A mobile application at the mobile device may then transmit the image of the insurance token to the insurance system (block 408). The mobile device may also identify the insurance customer associated with the insurance token. The insurance system may receive the image (block 410) and obtain the stored image associated with the identified insurance customer (block 412). An image matcher of the insurance system may compare the received image to the stored image (block 414).

If the image matcher determines that the received image does not match the stored image (block 416:N), then the insurance system may send the mobile application a notification indicating a picture mismatch (block 418). If, however, the image matcher determines that the received image matches the stored image, then the insurance system may retrieve the insurance information for the identified insurance customer and send the insurance information to the mobile application at the mobile device (block 420). The insurance system may also create a record of the scan message and indicate in the record the date, time, and location at which the insurance customer scanned the insurance information token (block 422). It will be appreciated that the insurance system may create a record of the scan message even if the received image does not match the stored image. The record of the scan message may thus indicate whether the image matcher determined a match or mismatch between the received image and the stored image.

In response to receipt of the scan message, the insurance system may also compare the scan message to records of previously received scan messages (block 424). In this way, the insurance system may determine whether multiple insurance customers scanned their respective insurance information tokens on the same day, at a similar time, and at a similar geographic location. If the insurance system locates matching scan records, the insurance system may determine that the insurance customers associated with the scan records were involved in the same incident and may be commonly associated with any insurance claims that result.

Also in response to receipt of the scan message, the insurance system may compare the scan message to vehicle telematics information (block 426). In this way, the insurance system may determine whether an insurance customer was potentially involved in an incident in involving the vehicle (e.g., a vehicle collision) based on telematics events observed through the analysis. As described above, the analysis of the vehicle telematics may indicate the vehicle of an insurance customer experienced a sudden stop event, hard braking event, or hard turning event. If the insurance system receives a scan message following one or more of these example events, then the insurance system may determine that the vehicle was involved in an incident that may require an insurance claim. It will be appreciated that the insurance system may also analyze the vehicle telematics information to identify any additional parties that were involved in the event. In particular, the insurance system may compare the scan message to other telematics events observed for other insurance customers. If the vehicles of other insurance customers experienced one of the example events on the same day, around the same time, and near the same geographic location as the scan message, then the insurance system may determine that this additional insurance customer was also involved in the incident.

Responsive to the analysis of scan records (block 424) or the analysis of vehicle telematics information (block 426), the insurance system may initiate various responses (block 428). Example responses may include notifying an insurance agent of the scan message such that the insurance may follow-up with the insurance customer, providing a set of questions to the mobile application at the mobile device of the customer, and automatically creating a placeholder insurance claim in case the insurance customer ultimately desires to file an insurance claim. Upon notification of the scan message, an insurance agent may proactively follow-up with the insurance customer, e.g., via phone, email, text message, or other means of communication. during the follow-up, the insurance agent may inquire as to the reason the insurance customer scanned the insurance information token. For example, the user may have been involved in a vehicle collision, and the insurance agent may obtain details about the collision for the insurance claim. Alternatively, the insurance customer may simply be interested in the details of a current insurance policy, and the insurance agent may offer new or additional insurance-related services. Additional communications between the insurance agent and the insurance customer during the follow-up will be appreciated with the benefit of this disclosure. The follow-up with the insurance customer may also be automated by transmitting to the mobile application at the mobile device a set of follow-up questions for the customer to answer. The mobile application may transmit the set of answers back to the insurance system, which may forward the answers to an insurance agent. The insurance system may also respond by creating a placeholder insurance claim. The insurance system may populate the placeholder insurance claim with basic information such as, e.g., the name and contact information for the insurance customer. Additional details for the insurance claim may be obtained during the follow-up with the insurance customer, but the initial steps will have already been automatically completed.

Figure 5:
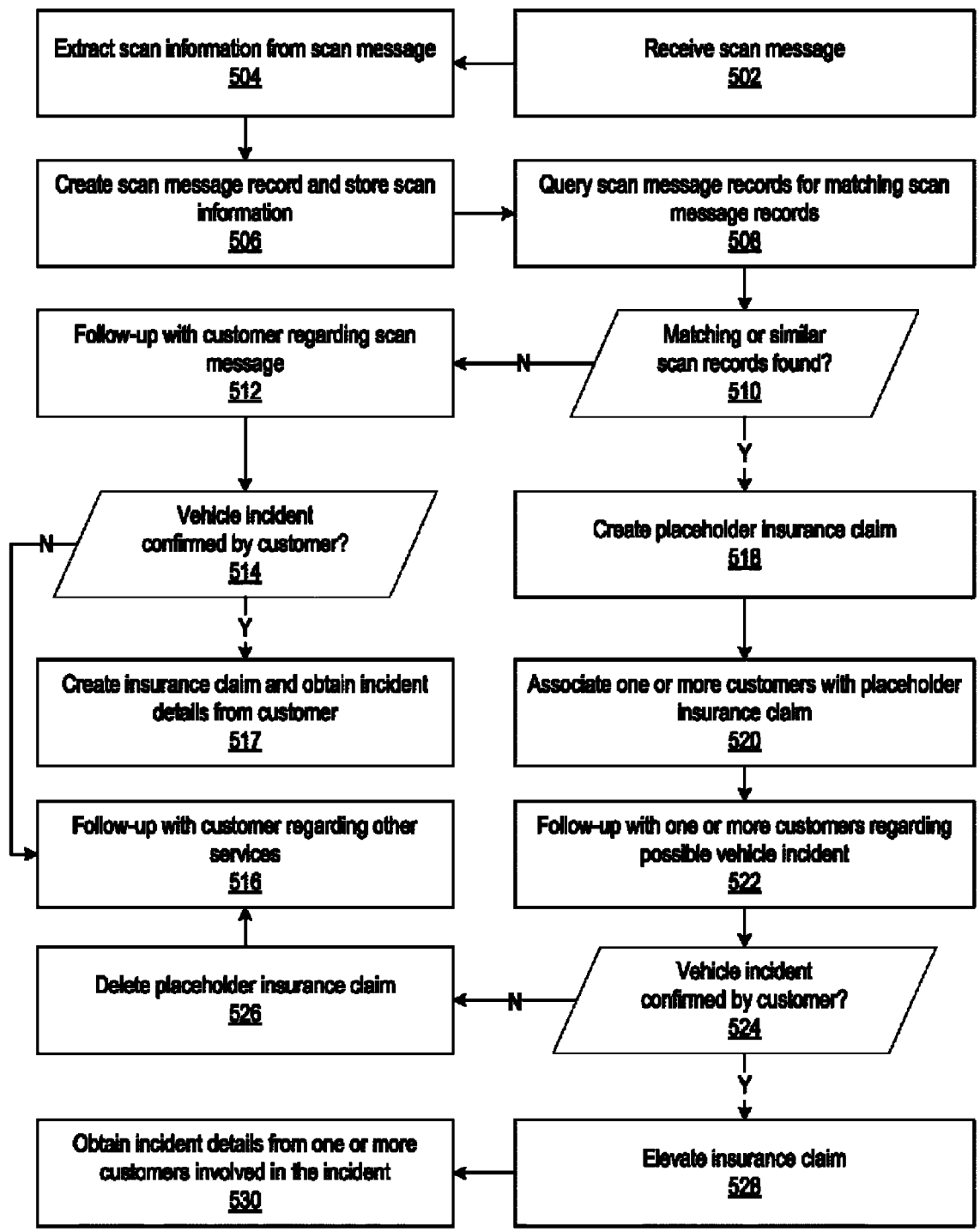
FIG. 5 is a flowchart of example method steps for responding to a request for insurance information.

FIG. 5 is a flowchart 500 of example method steps for responding to a scan message received from a mobile device following a scan of an insurance information token. A mobile application that provides insurance-related features may be installed at a mobile device. The mobile application may provide a scan message to an insurance system when an insurance customer scans an insurance information token (e.g., a QR code or an image) at a vehicle. Upon receipt of the scan message (block 502), the insurance system may extract information from the scan message (block 504). The information may include, e.g., the time, date, and location the insurance customer scanned the insurance information token. The insurance system may then create and store a scan record corresponding to the scan message (block 506) as described above. A record analyzer of the insurance system may then query the data store for scan records that match—or are at least similar to—the recently received scan message (block 508). As described above, the record analyzer may query for scan records having a matching or similar date, time, and location.

If the record analyzer does not locate matching or similar scan records (block 510:N), then the insurance system may initiate follow-up communications with the insurance customer regarding the scan message (block 512). The follow-up communications may be through a series of questions presented by the mobile application as described above. The answers to the questions may indicate the reason the insurance customer scanned the insurance information token. For example, the insurance customer may have scanned the insurance information token following a vehicle collision, following a traffic stop, or simply to check coverage information or effective dates. If the insurance customer indicates that a vehicle incident did not occur (block 514:N), then the insurance system may follow-up with the insurance customer regarding other insurance-related services (block 516), e.g., renewing an insurance policy, modifying insurance coverage, recommending tow services, recommending vehicle rental services, and other insurance-related services. If, however, the insurance customer indicates a vehicle incident did occur (block 514:Y), then the insurance system may create a typical insurance claim for the customer, and an insurance agent may follow-up with the customer to obtain details of the incident for the insurance claim (block 517).

If the record analyzer does locate matching or similar scan records (block 510:Y), then the insurance system may determine that an incident likely occurred between the customers respectively associated with the matching or similar scan records Upon determining that an incident likely occurred, the insurance system may create a placeholder insurance claim (block 518) for the potential incident. The insurance system may associate with the placeholder insurance claim the customers respectively associated with the matching or similar scan records (block 520). As described above, the insurance system may also populate the placeholder insurance claim with basic information such as, e.g., the contact information for the insurance customers. The insurance system may then notify an insurance agent who may follow-up with the insurance customers regarding the potential incident (block 522). If the insurance customers indicate that an incident did not occur (block 524:N), then the insurance agent may delete the placeholder insurance claim (block 526) and follow-up regarding any other insurance-related services that may be of interest to the insurance customers (block 516). If one of the insurance customers confirms that an incident occurred (block 524:Y), then the insurance agent may escalate the placeholder insurance claim to a confirmed insurance claim (block 528) and obtain the incident details from one or more of the insurance customers involved in the incident (block 530) to complete the claims process. It will thus be appreciated that the insurance system may advantageously enable an insurance company to detect when insurance customers scan their respective insurance information tokens, proactively follow-up with the insurance customers to provide various insurance services, and automatically prepare items such as insurance claims for potential claim filings.

Figure 6:
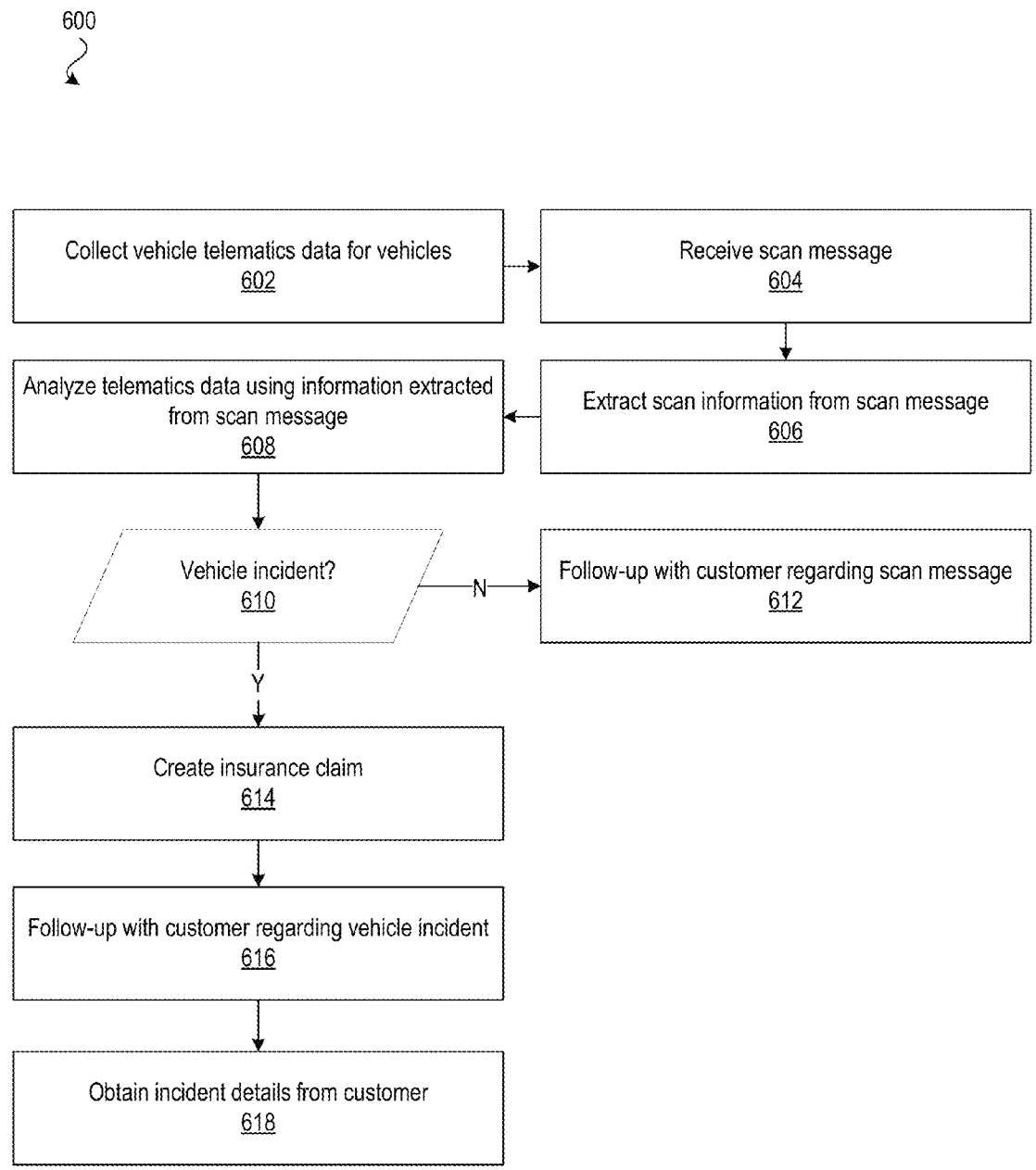
FIG. 6 is another flowchart of example method steps for responding to a request for insurance information.

FIG. 6 is also a flowchart 600 of example method steps for responding to an indication that an insurance customer scanned an insurance information token at a vehicle. As noted above, an insurance company may collect and store telematics data (block 602) from the vehicles of customers insured by the insurance company. The insurance system may receive scan message (block 604) when an insurance customer scans an insurance information token using a mobile device. The insurance system may extract information from the scan message (block 606), e.g., time, date, and location information. A telematics analyzer at the insurance system may analyze the collected telematics data using the information extracted from the scan message (block 608). For example, the telematics analyzer may analyze the telematics data to determine whether the vehicle experienced an event that may indicate an incident involving the vehicle has occurred, e.g., a hard braking event, a sudden stop event, or a hard turn event. In particular, the telematics analyzer may determine whether one of these types of events occurred at or around the same time, date, and location as the scan message.

If the telematics analyzer does not identify an event at or around the same time, date, and location as the scan message, then the insurance system may determine that an incident involving the vehicle did not likely occur (block 610:N). In response to the determination that the scan message did not likely follow a vehicle incident, the insurance system may initiate a follow-up with the insurance customer to determine whether the insurance customer has need of any insurance-related services (block 612). The follow-up communications may be through an insurance agent or a mobile application installed at a mobile device of the insurance customer as described above.

If, however, the telematics analyzer does identify an event at or around the same time, date, and location as the scan message, then the insurance system may determine that an incident involving the vehicle did likely occur (block 610:Y). Accordingly, the insurance system may initiate various responses upon determining that the insurance display message likely followed an incident involving the vehicle. As described above, the insurance system may automatically create and populate a placeholder insurance claim (block 614), follow-up with the insurance customer regarding the incident (block 616), and obtain additional details from the customer regarding the incident (block 618).

Figure 7A:
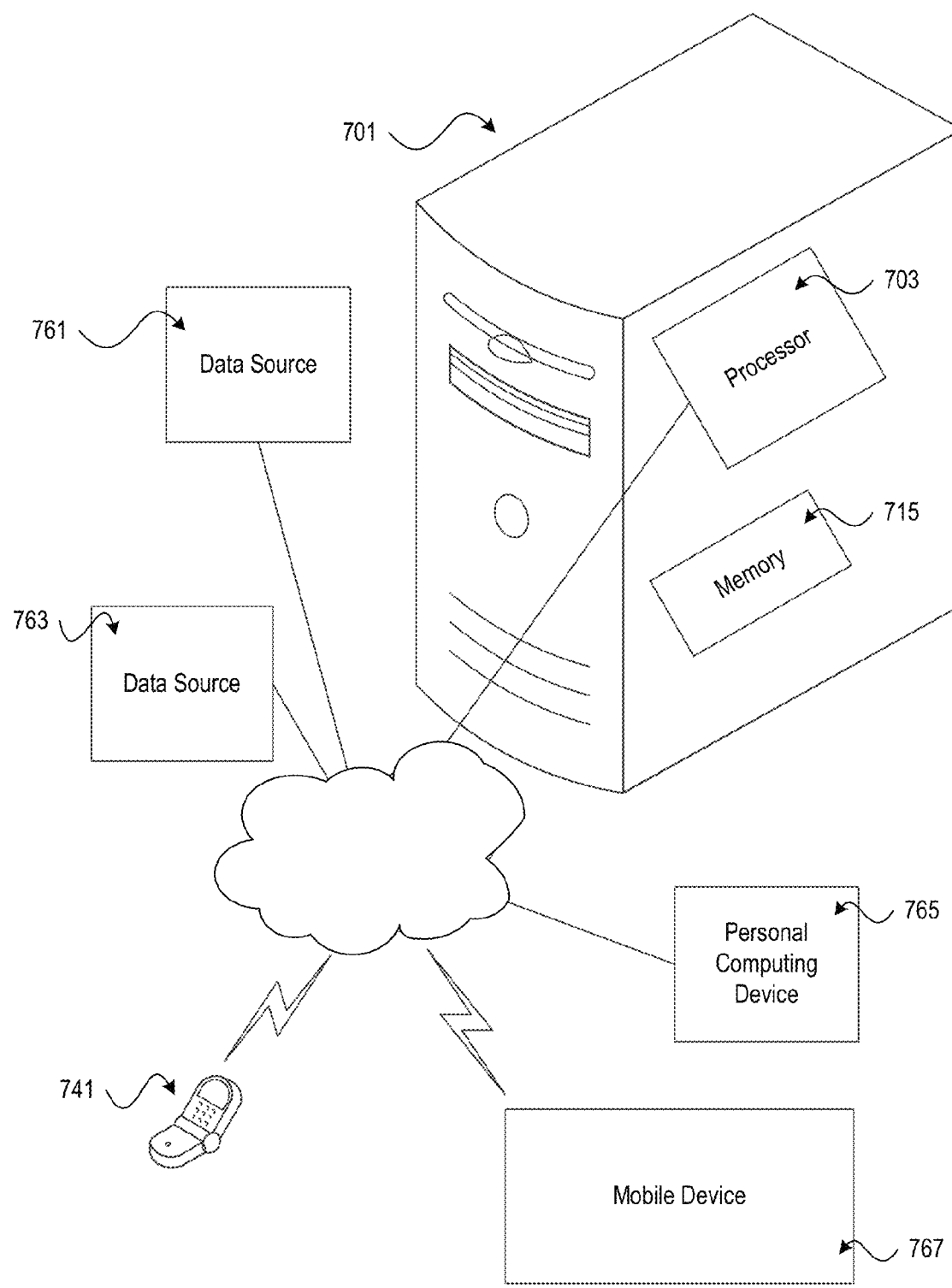
FIG. 7A is an example of an implementation of a suitable operating environment in which various aspects of the disclosure may be implemented.

Referring to FIG. 7A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 761, 763 in communication with a computing device 701. The computing device 701 may use information communicated from the data sources 761, 763 to generate values that may be stored in a database format. In one embodiment, the computing device 701 may be a high-end server computer with one or more processors 703 and one or more memories 715 for storing and maintaining the values generated. The memories 715 storing and maintaining the values generated need not be physically located in the computing device 701. Rather, the memories (e.g., ROM 707, RAM 705, flash memory, hard drive memory, RAID memory, and the like) may be located in a remote data store (e.g., memory storage area 227) physically located outside the computing device 701, but in communication with the computing device 701.

A personal computing device 765 (e.g., a personal computer, tablet PC, handheld computing device, personal digital assistant, mobile device, etc.) may communicate with the computing device 701. Similarly, a geographic positioning device 767 (e.g., a global positioning system (GPS), geographic information system (GIS), satellite navigation system, mobile device, other location tracking device, and the like) may communicate with the computing device 701. The communication between the computing device 701 and the other devices 765, 767 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 701 and other devices (e.g., devices 765, 767) may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a mobile device 767 may operate in a stand-alone manner by locally storing some of the database of values stored in the memories 715 of the computing device 701. For example, a mobile device 767 (e.g., a cellular telephone) may be comprised of a processor, memory, input devices 768, and output devices 769 (e.g., keypad, display screen, speaker, and the like). The memory may be comprised of a non-volatile memory that stores a database of values. Therefore, the mobile device 767 need not communicate, in one example, with a computing device 701 located at a remote location. Rather, the mobile device 767 may behave in a stand-alone manner and use its processor to perform particular steps disclosed herein. If desired, the mobile device 767 may be refreshed with an updated database of values after a period of time.

In yet another embodiment in accordance with aspects of the disclosure, a personal computing device 765 may operate in a stand-alone manner by locally storing some of the database of values stored in the memory of the computing device. For example, a personal computing device 765 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 765 may use the input device to read the contents of the CD-ROM media. Rather, the personal computing device 765 may behave in a stand-alone manner and use its processor to perform particular steps disclosed herein. If desired, the personal computing device may be provided with an updated database of values (e.g., in the form of updated CD-ROM media) after a period of time.

The data sources 761, 763 may provide information to the computing device 701. In one embodiment in accordance with aspects of the disclosure, a data source may be a computer which contains memory storing data and is configured to provide information to the computing device 701. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 761, 763 may be restricted to only authorized computing devices 701 and for only permissible purposes. For example, access to the data sources may be restricted to only those persons or entities that have signed an agreement (e.g., an electronic agreement) acknowledging their responsibilities with regard to the use and security to be accorded this information.

The computing device 701 may use the information from the data sources 761, 763 to generate values that may be used to retrieve and provide insurance information for insurance customers, respond to insurance information requests, and respond to scan messages. Some examples of the information that the data sources may provide to the computing device 701 include, but are not limited to, accident information, geographic information, and other types of information useful to provide insurance information and other insurance-related services.

Figure 7B:
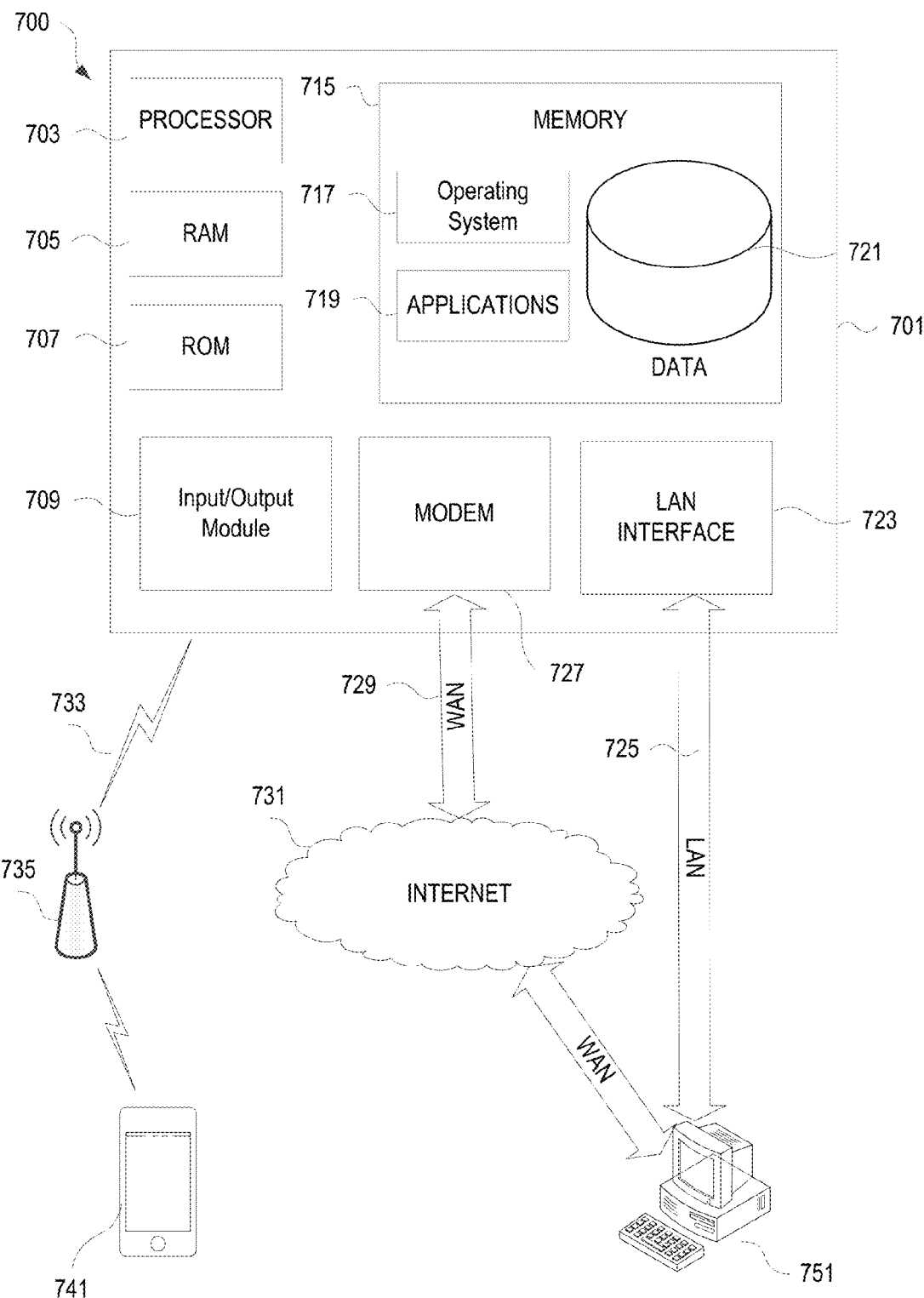
FIG. 7B is a block diagram of a system that may be used according to one or more example embodiments of the disclosure.

FIG. 7B illustrates a block diagram of a computing device (or system) 701 in the communication system 700 that may be used according to one or more illustrative embodiments of the disclosure. The device 701 may have a processor 703 for controlling overall operation of the device 701 and its associated components, including RAM 705, ROM 707, input/output (I/O) module 709, and memory 715. The computing device 701, along with one or more additional devices (e.g., terminals 741, 751) may correspond to any of multiple systems or devices, such as a system for obtaining insurance information in response to optical input (FIGS. 2-3), configured as described herein for responding to insurance information requests, performing image matching, and analyzing scan records and vehicle telematics data.

I/O module 709 may include a microphone, keypad, touch screen, and/or stylus through which a user of the computing device 701 may provide input, and may also include one or more of a speaker for providing audio output and a video display device for providing textual, audiovisual or graphical output. Software may be stored within memory 715 or storage to provide instructions to processor 703 for enabling device 701 to perform various functions. For example, memory 715 may store software used by the device 701, such as an operating system 717, application programs 719, and an associated internal database 721. Processor 703 and its associated components may allow the insurance underwriting system to execute a series of computer-readable instructions to, e.g., retrieve and provide insurance information in response to an insurance information request, match a retrieved image to a stored image, compare scan message information to scan message records and vehicle telematics information, and identify vehicle telematics events based on vehicle telematics information.

The insurance underwriting system may operate in a networked environment supporting connections to one or more remote computers, such as terminals 741 and 751. The terminals 741 and 751 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 701. The network connections may include a local area network (LAN) 725 and a wide area network (WAN) 729, and a wireless telecommunications network 733, but may also include other networks. When used in a LAN networking environment, the insurance underwriting system may be connected to the LAN 725 through a network interface or adapter 723. When used in a WAN networking environment, the system 701 may include a modem 727 or other means for establishing communications over the WAN 729, such as network 731 (e.g., the Internet). When used in a wireless telecommunications network 733, the system 701 may include one or more transceivers, digital signal processors, and additional circuitry and software for communicating with wireless computing devices 741 (e.g., mobile phones, vehicle telematics devices) via one or more network devices 735 (e.g., base transceiver stations) in the wireless network 733.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 719 used by the system may include computer executable instructions (e.g., image matching programs, telematics analysis programs, etc.) for responding to insurance information requests, scan messages, and performing other related functions as described herein.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure. For example, the insurance token may be applied to other types of objects insured by an insurance policy, e.g., a home insured by a homeowners insurance policy, a boat insured by a boat insurance policy, personal property insured by an insurance policy, and so forth. An insurance system may likewise receive scan messages when an insurance customers scans an insurance token associated with these alternative types of objects. The insurance system may also likewise create placeholder insurance claims and follow-up with insurance customers as described above in response to receipt of the scan messages.

What is claimed is:

1. A system for responding to a request for insurance policy information received from a mobile device, the system comprising:
   a physical token that affixes to a vehicle of an insurance customer, the physical token comprising a unique identifier associated with the insurance customer;
   a mobile device comprising a token scanning application stored thereon, the token scanning application optically scans the physical token to obtain the unique identifier and, in response to the scan, generates a scan message comprising the unique identifier a date, a time, and a location the physical token was scanned; and
   an insurance information server in signal communication with the mobile device and comprising:
      one or more processors;
      a data store that stores insurance policy information associated with the insurance customer, including the unique identifier;
      a communication interface that receives the scan message from the mobile device; and
      a memory storing instructions that when executed by one of the one or more processors cause the insurance information server to:
         transmit the insurance policy information to the mobile device wherein receipt of the insurance policy information by the mobile device causes the mobile device to present the insurance policy information at a display of the mobile device,
         create a record of the scan message, the record comprising the date, the time, and the location the mobile device scanned the physical token,
         determine whether the record substantially matches a stored record corresponding to a previously received scan message associated with a second insurance customer by comparing (i) the date of the record to a date of the stored record, (ii) the time of the record to a time of the stored record, and (iii) the location of the record to a location of the stored record, and
         responsive to determining that the record substantially matches the stored record, initiate creation of an insurance claim that identifies the insurance customer and the second insurance customer.

2. The system of claim 1 wherein:
the scan message includes information corresponding to an optical input received at the mobile device in response to optically scanning the physical token using an optical input device of the mobile device; and
wherein receipt of the scan message activates the insurance information server to transmit the insurance policy information to the mobile device based on the information corresponding to the optical input included in the scan message.

3. The system of claim 2 wherein:
the information corresponding to the optical input included in the scan message includes image data that corresponds to an image included in the physical token; and
the transmitting the insurance policy information to the mobile device comprises determining that the image data substantially matches a stored image associated with the insurance customer.

4. The system of claim 1 wherein:
receipt of the scan message activates the insurance information server to generate a notification and to transmit the notification to an insurance agent wherein the notification indicates that the physical token was scanned by the mobile device.

5. The system of claim 1 wherein:
receipt of the scan message activates the insurance information server to transmit one or more questions for the insurance customer to the mobile device requesting that the insurance customer provide information regarding a reason the physical token was scanned; and
receipt of one or more answers corresponding to the one or more questions provided by the insurance customer and transmitted by the mobile device to the insurance information server activates the insurance information server to transmit the one or more answers to an insurance agent.

6. The system of claim 1 wherein:
the communication interface further receives telematics information from the vehicle which characterizes operation of the vehicle wherein the telematics information comprises a date, a time, and a location;
receipt of the telematics information activates the insurance information server to determine that an incident involving the vehicle has occurred based on the telematics information received and whether the scan message was received following the incident;
determining that the scan message was received following the incident activates the insurance information server to determine whether the record of the scan message substantially matches the telematics information by comparing (i) the date of the record to a date of the telematics information, (ii) the time of the record to a time of the telematics information, and (iii) the location of the record to a location of the telematics information; and determining that the record of the scan message substantially matches the telematics information activates the insurance information server to initiate creation of an insurance claim that identifies the insurance customer.

7. The system of claim 6 wherein creation of the insurance claim comprises populating the insurance claim with customer information associated with the insurance customer.

8. The system of claim 1, wherein:
wherein the instructions when executed by one of the one or more processors further cause the insurance information server to:
determine whether the record of the scan message substantially matches second telematics information received from a second vehicle associated with the second insurance customer by comparing (i) the date of the record to a date of the second telematics information, (ii) the time of the record to a time of the second telematics information, and (iii) the location of the record to a location of the second telematics information, and responsive to determining that the record substantially matches the second telematics information, initiate creation of an insurance claim that identifies the insurance customer and the second insurance customer.

9. The system of claim 1, wherein:
the insurance claim created is a placeholder insurance claim; and
creation of the placeholder insurance claim is initiated without receiving a request from the insurance customer or an insurance agent to create the placeholder insurance claim from the mobile device.

\* \* \* \* \*